(No Model.)
A. A. WATERHOUSE.
REVERSIBLE BROILER OR TOASTER.
No. 364,323. Patented June 7, 1887.
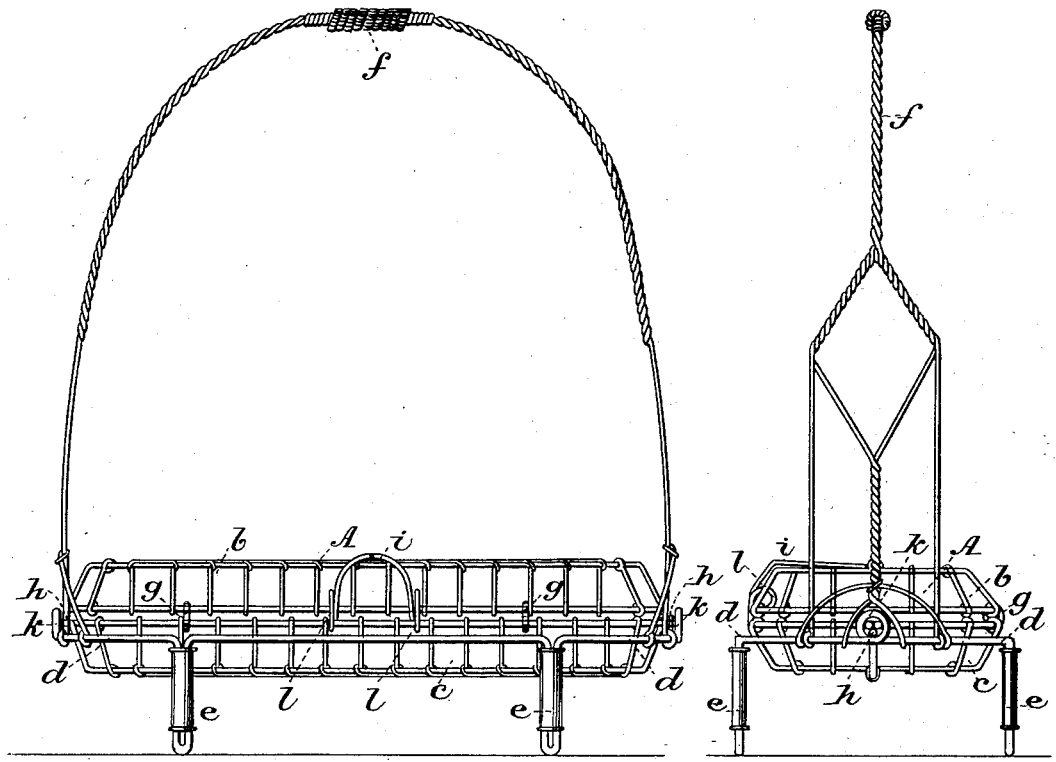
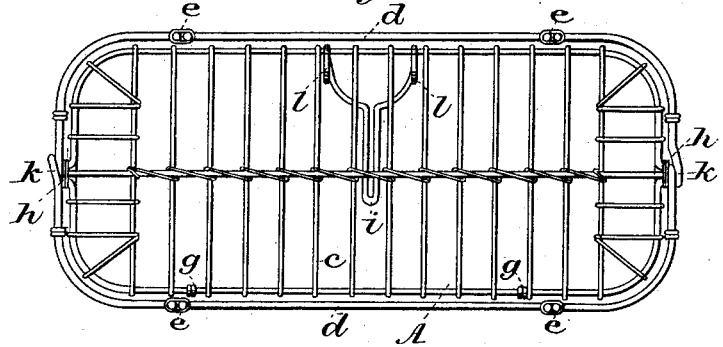
Witnesses:
E. N. Braudau
J. H. Hitching
Inventor:
Amelia A. Waterhouse
By her Att'y.
Alfonso Smith

UNITED STATES PATENT OFFICE.

AMELIA A. WATERHOUSE, OF SAN FRANCISCO, CALIFORNIA.

REVERSIBLE BROILER OR TOASTER.

SPECIFICATION forming part of Letters Patent No. 364,323, dated June 7, 1887.

Application filed February 12, 1886. Renewed April 1, 1887. Serial No. 233,342. (No model.)

*To all whom it may concern:*

Be it known that I, AMELIA A. WATERHOUSE, a resident of the city and county of San Francisco, State of California, have invented a new and useful Reversible Broiler or Toaster; and I hereby declare that the following is a full, clear, and exact description of the same, reference being had to the accompanying drawings.

The object of my invention is to provide means for toasting bread or broiling meat and fish in a cleanly and facile manner, and turning the same by a rotary motion of the broiler, which is adapted for use on an open hearth or in the furnace of a cooking stove.

The following description fully explains the nature of my said invention and the manner in which I proceed to construct, apply, and use the same, the accompanying drawings being referred to by figures and letters.

Figure 1 is a longitudinal elevation of the device. Fig. 2 is an end elevation of the same. Fig. 3 is a plan looking up from below.

Referring to Fig. 1, my reversible broiler A is attached to a frame, $d$, of thick wire, which is bent on the sides to forms legs $e$, each leg being formed of two parts of the wire, which are bound together by a piece of thin wire and covered with a piece of tin or other metal. On each end the wire frame is turned into a loop, $k$, in which the broiler is pivoted. A handle, $f$, is attached to the ends of the frame for the purpose of lifting the device with facility.

The broiler A is in the form of a shallow elongated wire basket, composed of two equal parts—an upper part, $b$, and a lower part, $c$. The functions of these parts are interchangeable, as when the broiler is rotated the article broiling or toasting is shifted from the lower part to the upper, and each part serves in turn as a broiler or gridiron. I make the broiler of any suitable length or width, and prefer to make it from one inch and a half to two inches in depth, for the purpose of giving an ordinary cut of meat or fish enough space to swell in the process of cooking. The two parts of the broiler are joined on one side by hinges $g$, and on the opposite side they are fastened by rings $l$, which are formed in a small catch or handle, $i$, attached to the lower part, $c$, of the broiler, and which slip over and catch on the rim of the upper part, $b$.

I obtain a rotary movement for the broiler, by which its parts are reversed, by swinging it on pivots $h$, which are formed by the ends of the wires of the rim or sides of the under part, $c$, of the broiler and the ends of the wire extending longitudinally along the bottom of the same, the ends of these wires being bound together by fine wire, and entering and acting in the loops $k$ in the frame $d$, Figs. 1, 2, 3.

In the construction of my reversible broiler I do not confine myself to the use of wire, but employ also for that purpose a thin sheet of suitable metal closely perforated, and hinge the two equal parts together and pivot them on a frame.

Having thus fully described my invention, what I claim as new, and desire to secure by Letters Patent, is—

The combination, with the wire frame $d$, having legs $e$ and loops $k$, all formed of a continuous piece of wire, of the toaster or broiler composed of two open sections united in the manner set forth, and having the end pivots, $h$, for insertion in loops $k$ of the frame, all substantially as and for the purpose set forth.

In witness whereof I have hereunto set my hand and seal.

AMELIA A. WATERHOUSE. [L. S.]

Witnesses:
ALPHONSO B. SMITH,
FERDINAND IMHORST.